(No Model.)
S. H. BELLOWS.
CALIPERS.
No. 299,722.  Patented June 3, 1884.
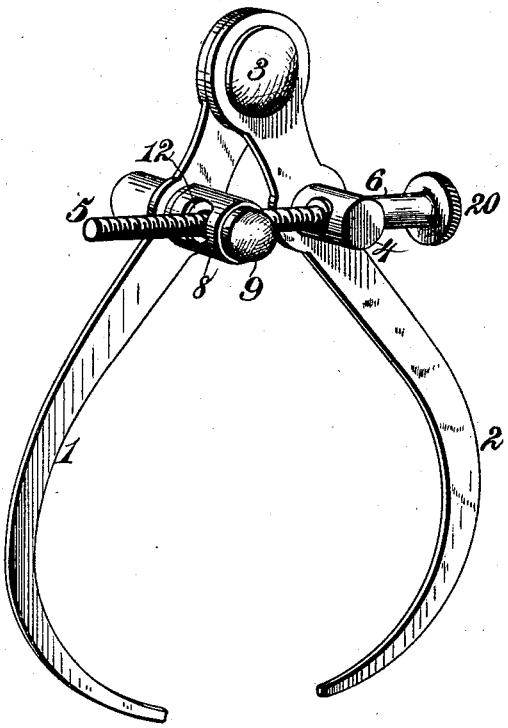
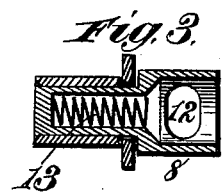
Witnesses.
Robert Everett,
Vinton Coombe
Inventor:
Stephen H. Bellows.
By James L. Norris.
Atty.

UNITED STATES PATENT OFFICE.

STEPHEN H. BELLOWS, OF ATHOL, MASSACHUSETTS.

CALIPERS.

SPECIFICATION forming part of Letters Patent No. 299,722, dated June 3, 1884.

Application filed March 22, 1884. (No model.)

*To all whom it may concern:*

Be it known that I, STEPHEN H. BELLOWS, a citizen of the United States, residing at Athol, in the county of Worcester and State of Massachusetts, have invented new and useful Improvements in Calipers, of which the following is a specification.

This invention relates to that class of calipers and analogous instruments in which two legs or jaws are pivoted to each other at one end, and the relation of the free ends to each other is controlled by a threaded rod secured in a stud upon one leg or jaw and passing through a threaded nut swiveled or pivoted upon or in the other leg or jaw. In using such instruments considerable time is consumed in opening and closing the free ends of the legs or jaws, making the adjustment thereof quite slow, the screw-thread upon the rod by which it is accomplished being necessarily very fine in order to give accurate measurements.

The object of my invention is to remedy this, constructing the calipers so that while retaining the fine adjustment of the screw-threaded rod and its coacting nut the two, when desired, may be instantaneously disengaged and the legs or jaws closed or opened instantly to any desired point within the limits of their possible movement.

Another object of my invention is to so arrange and construct these means for rapid adjustment that the spring usually employed to force the two legs or jaws apart may be dispensed with—a desirable object, in that the tension of the spring, especially when the jaws or legs are closed, is so great that it causes the tool to work hard, and causes the shoulders which take up the tension to become roughened, while with long use the springs become eventually weakened, often to the point of breaking.

To accomplish these objects I pivot together in the ordinary way the two legs or jaws, properly constructed for the designed uses. Upon one, near its pivoted end, is placed a stud, in which is secured the screw-rod for controlling the adjustment. This stud has a hole through it, slightly enlarged at each end, the enlargements having square shoulders. The screw-rod is formed with a shoulder at the end of its thread, the portion beyond such shoulder being adapted to pass through the hole in the stud until the shoulder thereon takes in the enlargement. Upon the plain end of the rod a sleeve, ending preferably in a milled head for ease of manipulation, is slipped, its end taking in the other enlargement of the aperture of the stud. A pin is passed through the sleeve and rod, uniting them together and securing the screw-rod rotatably in the stud. The screw-threaded portion of the rod passes through a nut upon the other leg or jaw, so that by rotation of the rod the free ends of the legs or jaws may be adjusted at will to or from each other within the limits of their possible movement. This nut, however, is so constructed that it may be instantaneously disengaged from the screw-rod and the legs or jaws moved to or from each other as rapidly as though no adjusting devices were used. To this effect a cylinder or case is swiveled or pivotally mounted in the second jaw or leg, and having apertures upon its opposite sides arranged to permit the screw-rod to pass therethrough without engagement therewith. Within this case or cylinder is placed the adjusting-nut proper, having an aperture through it, the lower portion of which is screw-threaded and arranged to fit and engage with the rod, while its upper portion is enlarged and plain, so that the rod may slide freely through such portion. The adjusting-nut is placed within the case or cylinder and a spring placed therein beneath its base, the resilience of the spring tending normally to keep the screw-threaded portion of the nut in engagement with the rod, so that in such condition the adjustments will be made by the use of the rod. The outer end of the nut, however, projects beyond the case or cylinders, and if pressure be applied to such projecting end the nut is forced within the case or cylinder against the stress of the spring, the screw-threaded portion being thereby disengaged from the rod, the larger and plain portion of the aperture being brought into such position that the legs or jaws may be moved either way instantaneously to any desired point, the rod simply sliding through such larger and plain portion of the aperture without any engagement therewith. As stated, the case or cylinder is pivoted or swiveled in its leg or jaw, and the nut is so placed therein as to be capable of rotary motion. This permits of their movement to adjust themselves to the varying angles which the screw-rod must make therewith, as the jaw or leg to which it is attached through its stud is moved. The construction thus generally described may be better understood by reference to the drawings, in which—

Figure 1 is a perspective view of calipers embodying my invention, while Figs. 2, 3, 4, and 5 are views of details thereof, as hereinafter explained.

1 and 2 are the legs or jaws of calipers or analogous device jointed by a pivot, 3, of usual construction.

Upon 2 is secured the stud 4, having an aperture, 14, therethrough, which is enlarged at its ends, as shown by 15 15 in Fig. 4, the enlargements joining the body of the aperture by square shoulders or offsets. In this stud 4 is secured the screw-rod 5 for controlling the screw adjustment of the free ends of the jaws or legs relatively to each other. This screw-rod consists of two portions, one, 18, being screw-threaded, while 19 is plain, 18 and 19 being separated by a lug or by a shoulder, 17, of a size adapted to take and fit in one of the enlargements 15 of the aperture through the stud 4. The plain end 19 being passed through 14 until 17 takes in 15, a cylinder, 6, preferably ending in a milled head, 20, is slid thereover until its inner end takes in the other enlargement 15, when a pin, 7, is passed through 5 and 6, uniting them together for manipulation and rotatably securing rod 5 in the stud. It is evident that the same result may be obtained by the use of a pin through, or of a small lug or projection upon, 5 in lieu of the shoulder 17.

Upon or in the other arm, 1, is secured the case or cylinder 8, (shown in cross-section in Fig. 3,) and having upon its sides and opposite to each other two apertures, 12, of a size adapted to permit 5 to pass therethrough without engagement therewith, and also of greater size, or elongated in the line of rotation or movement of 8, so that it may be free from 5 in all its positions relatively thereto. Preferably the lower part of this case or cylinder may be made somewhat contracted, as shown in Fig. 3, and within the chamber formed in this contraction is placed a spring, 13, tending normally to force outward anything placed therein. Within this case or cylinder is placed the adjusting-nut 9. (Shown in Fig. 2.) It is provided with an aperture, 11, the lower portion of which is of a size and threaded to fit upon and engage with the rod 5, while its upper portion is somewhat larger and plain, so that 5, when disengaged from the threaded portion of 8, may readily slide therethrough. The nut 9 is preferably formed with a projection, 10, upon its base, of a size taking into the contracted chamber in the base of 8 and upon the spring 13 therein. The nut 9 is placed within the case or cylinder 8 and the rod 5 passed through the apertures in both, 5 being then secured in 4 in the manner before described. The resilience of 13 then tends normally to keep the smaller and threaded portion of aperture 11 in nut 9 in engagement with the thread of rod 5, and the jaws or legs 1 2 can be set then only by manipulation of the rod 5. As shown in Fig. 1, however, the outer end of 9 projects beyond its containing case or cylinder 8, and if it be desired to make large or rapid adjustments, it is simply necessary to depress 9, releasing thereby the rod and the threaded portion of aperture 11 in nut 9 from engagement with each other, when the legs or jaws may be moved in either direction to the desired point as freely as if no adjusting devices were used. The shoulders formed upon 9 by the projection 10, and formed in 8 by the contraction of the lower part thereof, serve as stops for determining in one direction the limit of movement of 9 within 8; but it is evident that this determination may be accomplished in various equivalent ways—as, for instance, by a pin in one taking in a slot in the other. By this construction calipers are furnished in which the use of a spring to move the legs or jaws in one direction is avoided, and in which the delicate adjustments furnished by a finely-threaded rod and nut are preserved, while capacity for throwing such adjusting devices out of operation and making rapid and instantaneous adjustments irrespective thereof is furnished, the result being a tool economical in construction, accurate and positive in operation, and of great durability.

While I have used the term "calipers" herein, it is to be understood that the application of the means of adjustment is not confined to what are technically termed "calipers" alone, but that such term is used herein as typical of all that class of instruments in which jaws or legs are to be adjusted relatively to each other and then maintained for a greater or less time in such adjusted relation—such as calipers, mongrels, dividers, drafting-instruments, wrenches, &c., to all of which the means of adjustment are applicable.

It will be observed that the separate means for adjustment attached to both legs are connected thereto below the pivot 3 of the two legs. By thus locating the parts the sliding nut can be more easily and conveniently operated and the adjustment more readily effected than if the adjusting means were located above the pivots.

Having thus described my invention, what I claim, is—

1. In calipers, the combination of two legs or jaws, a stud mounted upon one thereof, a screw-threaded rod secured in such stud, a cylinder or case swiveled or mounted in or upon the other leg or jaw, and a nut for engagement with the rod swiveled or rotatably mounted and spring-seated within the cylinder or case, substantially as described.

2. In calipers, the combination, with a screw-rod mounted or secured, through the medium of a stud, upon one leg or jaw, of a nut for engagement therewith secured within a case or cylinder mounted upon the other leg or jaw and provided with an aperture, part of which is adapted to engage with and fit upon the screw-rod, while the remaining portion is constructed to be free therefrom and not impede the movement of the rod therethrough, substantially as described.

3. In calipers, the combination, with the screw-adjusting rod, of a nut having an aperture, part of which is adapted to take upon and engage with the rod, while part is constructed to be free therefrom, and means, substantially as described, for throwing the part adapted to engage with the rod out of engagement therewith, substantially as described.

4. In calipers, the combination, with the nut adapted to engage with the adjusting-screw rod, of a containing case or cylinder mounted upon one leg or jaw, and means, substantially as described, for controlling the position of the nut therein and its relation to the adjusting-rod, substantially as specified.

5. The combination, in calipers, of the stud 4, screw-rod 5, case 8, nut 9, having aperture 11, and spring 13, arranged and operating substantially as described.

In testimony whereof I affix my signature in presence of two witnesses.

STEPHEN H. BELLOWS.

Witnesses:
E. V. WILSON,
J. J. COXETER.